(12) United States Patent
Lim et al.

(10) Patent No.: US 10,954,444 B2
(45) Date of Patent: Mar. 23, 2021

(54) LIQUID CRYSTAL COMPOUND AND USE THEREOF

(71) Applicant: LG Chem, Ltd., Seoul (KR)

(72) Inventors: Eun Jung Lim, Daejeon (KR); Ki Chul Koo, Daejeon (KR); Dong Hyun Oh, Daejeon (KR)

(73) Assignee: LG Chem, Ltd.

( * ) Notice: Subject to any disclaimer, the term of this patent is extended or adjusted under 35 U.S.C. 154(b) by 165 days.

(21) Appl. No.: 16/068,471

(22) PCT Filed: May 23, 2017

(86) PCT No.: PCT/KR2017/005306
§ 371 (c)(1),
(2) Date: Jul. 6, 2018

(87) PCT Pub. No.: WO2017/204515
PCT Pub. Date: Nov. 30, 2017

(65) Prior Publication Data
US 2019/0016956 A1    Jan. 17, 2019

(30) Foreign Application Priority Data

May 23, 2016   (KR) .................. 10-2016-0062877

(51) Int. Cl.
| | | |
|---|---|---|
| *G02F 1/1333* | (2006.01) | |
| *C09K 19/40* | (2006.01) | |
| *C09K 19/34* | (2006.01) | |
| *C07F 7/08* | (2006.01) | |
| *G02F 1/137* | (2006.01) | |
| *G02F 1/139* | (2006.01) | |

(52) U.S. Cl.
CPC .......... *C09K 19/406* (2013.01); *C07F 7/0812* (2013.01); *C07F 7/0838* (2013.01); *C09K 19/3444* (2013.01); *C09K 19/3483* (2013.01); *C09K 19/408* (2013.01); *G02F 1/1375* (2013.01); *G02F 1/1391* (2013.01); *G02F 1/13781* (2013.01); *G02F 2001/13756* (2013.01)

(58) Field of Classification Search
CPC ............. C09K 19/406; C09K 19/3444; C09K 19/3483; C09K 19/408; G02F 1/1333; G02F 1/1375; G02F 1/13781; G02F 1/1391; G02F 2001/13756; C07F 7/0812; C07F 7/0838
USPC .................................................. 252/299.66
See application file for complete search history.

(56) References Cited

U.S. PATENT DOCUMENTS

| | | | | |
|---|---|---|---|---|
| 5,210,247 A | * | 5/1993 | Haberle | ............... C07F 7/21 556/413 |
| 5,455,697 A | | 10/1995 | Coles et al. | |
| 5,547,604 A | | 8/1996 | Coles et al. | |
| 2010/0283925 A1 | | 11/2010 | Hannington et al. | |
| 2012/0032994 A1 | | 2/2012 | Coles et al. | |
| 2013/0155340 A1 | | 6/2013 | Clapp et al. | |
| 2013/0342775 A1 | | 12/2013 | Sun et al. | |
| 2016/0115389 A1 | | 4/2016 | Lim et al. | |

FOREIGN PATENT DOCUMENTS

| | | |
|---|---|---|
| CN | 102634349 A | 8/2012 |
| JP | H0649080 A | 2/1994 |
| JP | H06118396 A | 4/1994 |
| JP | H06240259 A | 8/1994 |
| JP | H09227580 A | 9/1997 |
| JP | 2007186695 A | 7/2007 |
| JP | 2011502193 A | 1/2011 |
| JP | 2013522418 A | 6/2013 |
| KR | 20100093062 A | 8/2010 |
| KR | 20110105819 A | 9/2011 |
| KR | 20150007998 A | 1/2015 |
| WO | 0218514 A1 | 3/2002 |
| WO | 2009054855 A1 | 4/2009 |
| WO | 2013097181 A1 | 7/2013 |

OTHER PUBLICATIONS

Newton et al., "Synthesis and Properties of Low-molar-mass Liquid-crystalline Siloxane Derivatives", J. Mater. Chem., 1994, 4(6), 869-874 (Year: 1994).*
Search report from International Application No. PCT/KR2017/005306, dated Aug. 29, 2017.
He et al., Transmission holographic gratings using (siloxane and mesogen)-containing compound, Designed Monomers and Polymers, 2005, pp. 473-486, vol. 8, No. 5, VSP.
Extended European Search Report including Written Opinion for Application No. EP17803034.2 dated Apr. 4, 2019.

* cited by examiner

*Primary Examiner* — Geraldina Visconti
(74) *Attorney, Agent, or Firm* — Lerner, David, Littenberg, Krumholz & Mentlik, LLP

(57) ABSTRACT

The present application relates to a novel liquid crystal compound and a use thereof. The novel liquid crystal compounds of the present application can exhibit a smectic A phase over a wide temperature range. The novel liquid crystal compounds of the present application can be usefully used in the technical fields to which smectic A liquid crystals can be applied, for example, bistable devices.

14 Claims, 1 Drawing Sheet

[Figure 1]
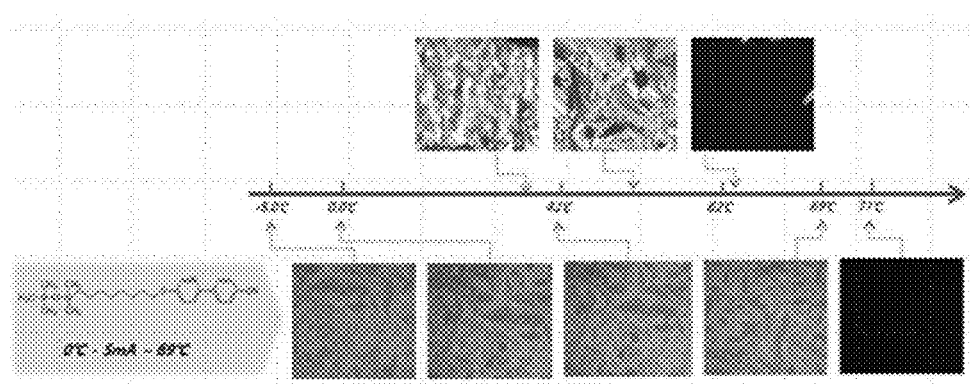

LIQUID CRYSTAL COMPOUND AND USE THEREOF

CROSS-REFERENCE TO RELATED APPLICATION(S)

The present application is a national phase entry under 35 U.S.C. § 371 of International Application No. PCT/KR2017/005306, filed on May 23, 2017, which claims the benefit of priority to Korean Patent Application No. 10-2016-0062877, filed on May 23, 2016, the disclosures of which are herein incorporated by reference.

TECHNICAL FIELD

The present application relates to a novel liquid crystal compound and a use thereof.

BACKGROUND ART

Smectic A liquid crystals can be used in bistable devices. For example, smectic A liquid crystals can cause a high scattering state due to movement of a charging substance added in a DC or low frequency AC electric field, and the scattering state can be converted to a non-scattering state due to the dielectric reorientation of the liquid crystals in a high frequency AC electric field. The scattering state and the non-scattering state can realize a bistable device while being maintained even after the electric field is removed (Patent Document 1: Korean Laid-Open Patent Publication No. 2015-0007998).

Smectic A liquid crystals are difficult to ensure compatibility because of limitations of physical properties such as transition temperature characteristics. Therefore, it is necessary to secure a compatible temperature range of smectic A liquid crystals, and in particular, it is necessary to develop a liquid crystal compound having a wide temperature range for a smectic A phase.

DISCLOSURE

Technical Problem

The present application provides a novel liquid crystal compound having a broad temperature range for the smectic A phase and a use thereof.

Technical Solution

The present application relates to a novel liquid crystal compound. An exemplary liquid crystal compound of the present application may be a liquid crystal compound of the following formula 1.

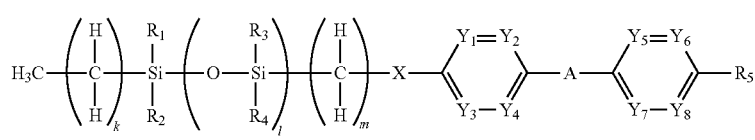

[Formula 1]

in Formula 1 above,
$R_1$ to $R_4$ are each independently an alkyl group having 1 to 3 carbon atoms,
$R_5$ is —F, —Cl, —Br, —OF$_3$, —NCS, —CN or —OCH$_3$,
X is —CH$_2$— or —O—,
k is an integer of 0 to 9,
l is an integer of 0 to 2,
m is an integer of 2 to 13,
$Y_1$ to $Y_8$ are each independently CH, CF or N, where CF of $Y_1$ to $Y_8$ is not more than 2,
A is the following Formula 2, or a single bond, —O—, —S—, —CO—, —COO—, —OCO—, —S—CO—, —CO—S—, —O—COO, —CO—NR$^o$—, —NR$^o$—CO—, —NR$^o$—CO—NR$^{oo}$—, —NR$^o$—CO—O—, —O—CO—NR$^o$—, OCH$_2$—, —OCH$_2$—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CHF$_2$—, —CH═N—, —N═CH—, —NH—NH—, —N═N—, —CH—CR$^o$—, —CY$^1$═CY$^2$—, —C≡C—, —CH═CH—COO— or —OCO—CH═CH—, where R$^o$, R$^{oo}$, Y$^1$ and Y$^2$ are each independently H or CH$_3$;

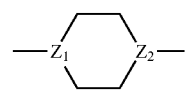

[Formula 2]

in Formula 2 above, $Z_1$ and $Z_2$ are each independently CH or N, and when $Z_1$ and $Z_2$ are each CH, at least one of $Y_1$ to $Y_8$ is N.

The liquid crystal compound of the present application may exhibit the smectic A phase in a wide temperature range. In the present application, the term "smectic phase" may mean a liquid crystal phase having characteristics in which a director of the liquid crystal compound aligns in a predetermined direction and at the same time the liquid crystal compound is arranged while forming a layer or a plane. The smectic phase can be contrasted with the nematic phase in that the director of the liquid crystal compound aligns in a predetermined direction, but the liquid crystal compound is arranged without forming a layered structure or a planar structure. In this specification, the director of the liquid crystal compound may mean the long axis direction of a rod when the liquid crystal compound has a rod shape, and may mean the normal direction of a disc when the liquid crystal compound has a disc shape. In the present application, the term "smectic A phase" may mean a liquid crystal phase in which the director of the liquid crystal compound aligned in the smectic phase is perpendicular to the smectic layer or plane.

In Formula 1 above, $R_1$ to $R_4$ may be each independently an alkyl group having 1 to 3 carbon atoms. Specifically, each of $R_1$ to $R_4$ may be a methyl group, an ethyl group or a propyl group. According to one embodiment of the present application, each of $R_1$ to $R_4$ may be a methyl group.

In Formula 1 above, $R_5$ may be —F, —Cl, —Br, —OF$_3$, —NCS, —CN or —OCH$_3$. According to one embodiment of the present application, $R_5$ may be —CN.

In Formula 1 above, k may be an integer of 0 to 9. Specifically, k may be an integer of 0 to 7, an integer of 0 to 5, or an integer of 0 to 3. According to one embodiment of the present application, k may be 0 or 3.

In Formula 1 above, l may be an integer of 0 to 2. According to one embodiment of the present application, l may be 0 or 1.

In Formula 1 above, m may be an integer of 2 to 13. Specifically, m may be an integer of 5 to 11 or 7 to 9. According to one embodiment of the present application, m may be 8.

In Formula 1 above, $Y_1$ to $Y_8$ may be each independently CH, CF or N. When at least one of $Y_1$ to $Y_8$ is CF, the CF may be two or less. In one example, when A in Formula 1 above is a heterocyclic structure, for example, a cyclic structure including N, $Y_1$ to $Y_8$ may satisfy the above condition. In another example, when A in Formula 1 above is not a heterocyclic structure, for example, a cyclic structure including N, it is preferred that at least one of $Y_1$ to $Y_8$ is N.

In Formula 1 above, A may be Formula 2 above, or a single bond, —O—, —S—, —CO—, —COO—, —OCO—, —S—CO—, —CO—S—, —O—COO, —CO—NR$^O$—, —NR$^O$—CO—, —NR$^O$—CO—NR$^{OO}$—, —NR$^O$—CO—O—, —O—CO—NR$^O$—, OCH$_2$—, —OCH$_2$—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CHF$_2$—, —CH=N—, —N=CH—, —NH—NH—, —N=N—, —CH—CR$^O$—, —CY$^1$=CY$^2$—, —C≡C—, —CH=CH—COO— or —OCO—CH=CH—. The R$^O$, R$^{OO}$, Y$^1$ and Y$^2$ may be each independently H or CH$_3$. In Formula 2 above, the $Z_1$ and $Z_2$ may be each independently CH or N.

The term "single bond" herein means a case where no separate atom is present in the part represented by A. For example, when A in Formula 1 is a single bond, benzenes on both sides of A can form a directly linked structure.

According to one embodiment of the present application, A may be a single bond or Formula 2. In one example, when the A is a single bond, at least one of $Y_1$ to $Y_8$ may be N. According to one embodiment of the present application, when the A is a single bond, any one of $Y_1$ to $Y_8$ may be N and the remainder may be CH. In another example, when the A is Formula 2 and $Z_1$ and $Z_2$ are CH, at least one of $Y_1$ to $Y_8$ may be N. According to one embodiment of the present application, when the A is Formula 2 and $Z_1$ and $Z_2$ are CH, any one of $Y_1$ to $Y_8$ may be N and the remainder may be CH. In another example, when the A is Formula 2 and $Z_1$ and $Z_2$ are N, $Y_1$ to $Y_8$ may be each independently CH, CF or N. According to one embodiment of the present application, when the A is Formula 2 and $Z_1$ and $Z_2$ are N, $Y_1$ to $Y_8$ may each be CH.

The liquid crystal compound of Formula 1 above may be, for example, a compound of the following formulas a-1 to a-18.

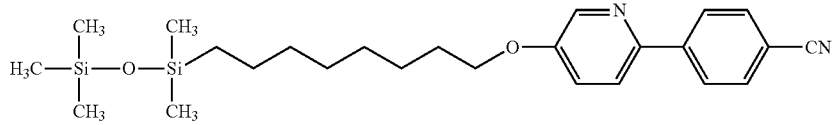

<Formula a-1>

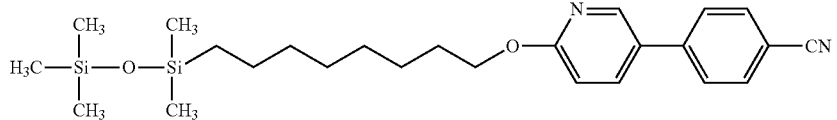

<Formula a-2>

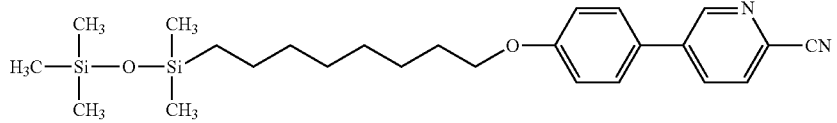

<Formula a-3>

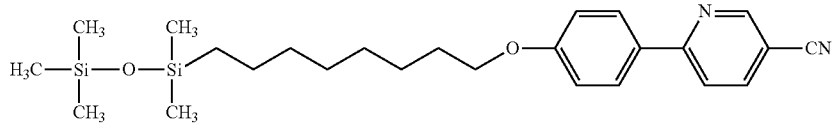

<Formula a-4>

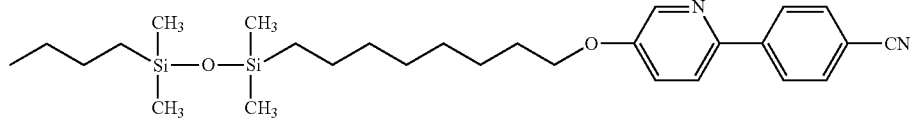

<Formula a-5>

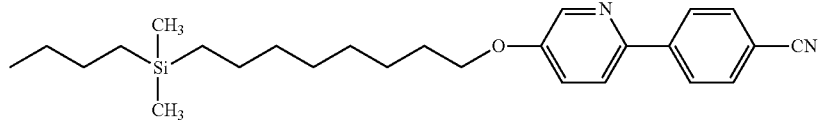

<Formula a-6>

-continued
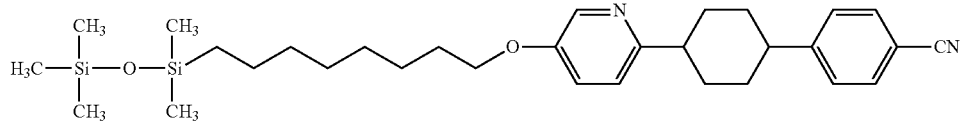
<Formula a-7>
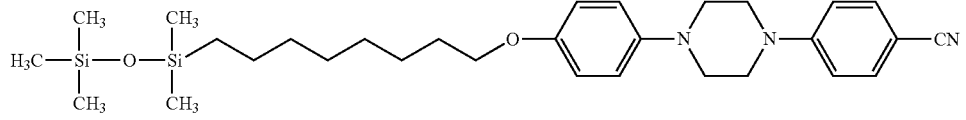
<Formula a-8>
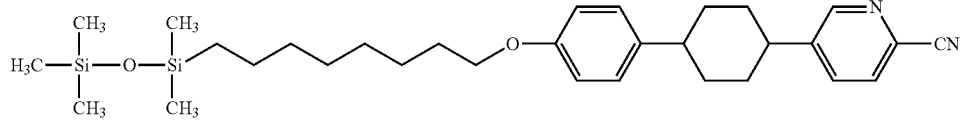
<Formula a-9>
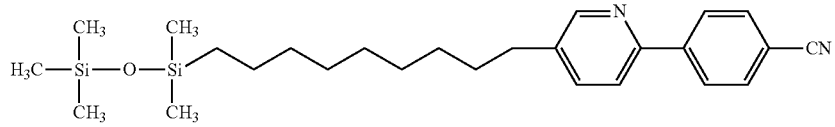
<Formula a-10>
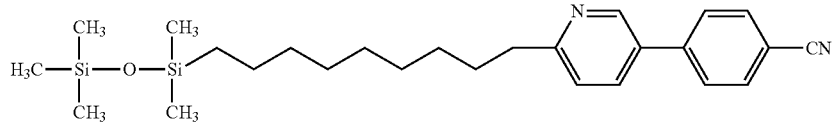
<Formula a-11>
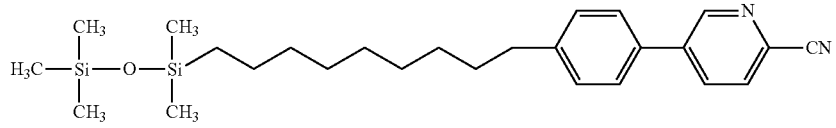
<Formula a-12>
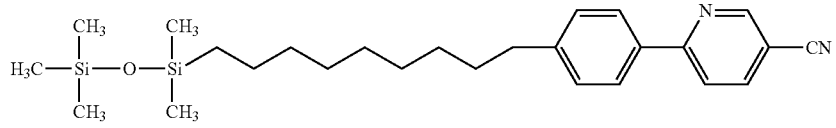
<Formula a-13>
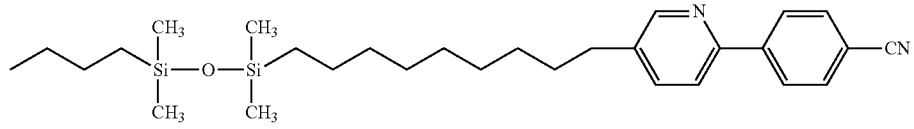
<Formula a-14>
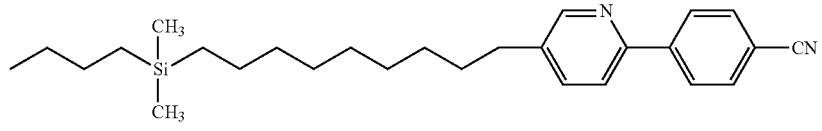
<Formula a-15>
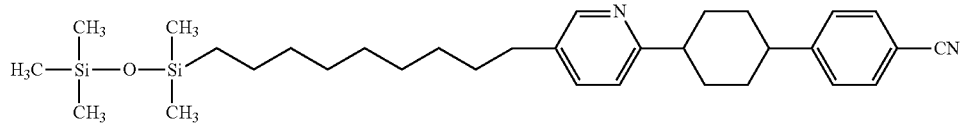
<Formula a-16>
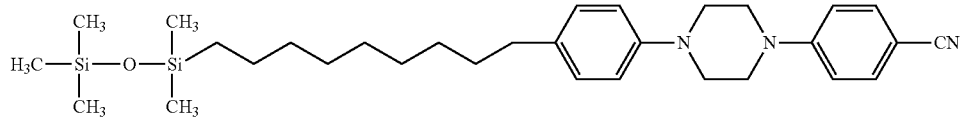
<Formula a-17>

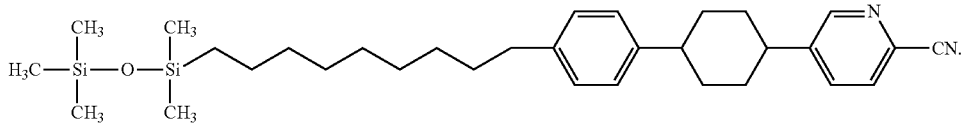

<Formula a-18>

The liquid crystal compound of the present application may exhibit a smectic A phase in a wide temperature range. In one example, the liquid crystal compound may exhibit a smectic A phase in a temperature range of −20° C. to 100° C. According to one embodiment of the present application, the lower limit of the smectic A phase temperature range of the liquid crystal compound may be −20° C. or higher, −15° C. or higher or −12° C. or higher. According to an embodiment of the present application, the upper limit of the smectic A phase temperature range of the liquid crystal compound may be 100° C. or lower, 90° C. or lower, 80° C. or lower, or 78° C. or lower. The dielectric anisotropy of the liquid crystal compound of the present application may be, for example, from −1 to 20.

The present application also relates to a use of the liquid crystal compound. Since the liquid crystal compound can exhibit a smectic A phase over a wide temperature range, it can be usefully used in a technical field to which the smectic A liquid crystal can be applied.

In one example, the present application relates to a bistable device comprising the liquid crystal compound. The bistable device may be a concept corresponding to a monostable device. In the present application, the term "monostable device" may mean a device in which application of external energy is continuously required to maintain at least one of liquid crystalline states, and the term "bistable device" may mean a device in which external energy is required only upon change of the state.

In one example, the bistable device may comprise two electrode substrates disposed opposite to each other and a liquid crystal layer containing the liquid crystal compound between the two electrode substrates. The liquid crystal layer may further comprise an additive that induces a so-called EHDI (electrohydrodynamic instability). The additive may be, for example, a charging substance. The charging substance may be, for example, an ionic compound. The ionic compound may mean a compound in the form of a salt containing a cation and an anion. As the ionic compound, a known material that can be applied to a bistable device using smectic A liquid crystals can be used. The ionic compound may be, for example, a nitrogen-containing onium salt, a sulfur-containing onium salt or a phosphorus-containing onium salt, comprising $F^-$, $I^-$, $Cl^-$, $Br^-$, $ClO_4^-$ or the like as an anion, but is not limited thereto.

The bistable device can switch the scattering state or the non-scattering state depending on the applied electric field. The scattering state may mean a state where the liquid crystal compound is irregularly arranged by the EHDI induced by the charging substance. The bistable device can realize a haze mode in which a liquid crystal cell exhibits a haze of a predetermined level or more in the scattering state. The non-scattering state may mean a state where the smectic liquid crystal compound forms a layer and is aligned depending on its characteristics. The bistable device can realize a non-haze mode in which it exhibits a state of capable of transmitting light or a haze of a predetermined level or less in the non-scattering state.

In one example, the bistable device may induce the scattering state when a low-frequency electric field within a range of about 1 to 500 Hz is applied, and may induce the non-scattering state when a high-frequency electric field of about 1 kHz or more is applied. In the scattering state or the non-scattering state, the bistable device requires an electric field only when the state changes, and requires no electric field to maintain the state.

The two electrode substrates can apply an electric field to the liquid crystal layer so that the state of the liquid crystal compound can be converted. Each of the two electrode substrates may comprise a substrate and an electrode layer on the substrate. As the base material layer, for example, a glass or plastic film can be used. As the plastic film, for example, a substrate comprising TAC (triacetyl cellulose); COP (cyclo olefin copolymer) such as norbornene derivatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (polyether sulfone); PEEK (polyetheretherketon); PPS (polyphenylsulfone), PEI (polyetherimide); PEN (polyethylenenaphthalate); PET (polyethyleneterephthalate); PI (polyimide); PSF (polysulfone); PAR (polyarylate), or amorphous fluorine resins, or the like may be used, without being limited thereto. If necessary, a coating layer of gold, silver or a silicon compound such as silicon dioxide or silicon monoxide, or a coating layer such as an antireflection layer may also be present on the substrate. The electrode layer may be a transparent electrode layer. For example, the electrode layer may comprise a conductive polymer, a conductive metal, a conductive nanowire, or a metal oxide such as ITO (indium tin oxide), but is not limited thereto.

The bistable device may further comprise an anisotropic dye in the liquid crystal layer, if necessary. The term "anisotropic dye" herein may mean a material capable of anisotropically absorbing light in at least a part or the entire range of the visible light region. As the anisotropic dye, a black dye may be used. As the anisotropic dye, for example, an azo dye or an anthraquinone dye may be used, without being limited thereto. When the liquid crystal layer contains an appropriate amount of an anisotropic dye, the variable transmittance characteristics of the device can be controlled.

The bistable liquid crystal device may further comprise a polymer network in the liquid crystal layer, if necessary. In one example, the polymer network may be included in a liquid crystal layer as a structure in which the polymer network is distributed in a continuous phase liquid crystal compound, a so-called PNLC (polymer network liquid crystal) structure. In another example, the polymer network may be included in a liquid crystal layer as a structure present in a state where liquid crystal regions comprising the liquid crystal compound are dispersed in the polymer network, a so-called PDLC (polymer dispersed liquid crystal) structure. The polymer network may be a network of a polymer precursor comprising a polymerizable compound. The polymer network may comprise the polymerizable compound in a polymerized state. As the polymerizable compound, a (meth)acrylate compound or the like can be used, without being limited thereto. When the liquid crystal layer comprises an appropriate amount of a polymer network, the haze or variable transmittance characteristics of the device can be controlled.

Effects of the Invention

The novel liquid crystal compounds of the present application can exhibit a smectic A phase over a wide temperature range. The novel liquid crystal compounds of the present application can be usefully used in the technical fields to which smectic A liquid crystals can be applied, for example, bistable devices.

BRIEF DESCRIPTION OF THE DRAWING

FIG. 1 is the results of evaluating the smectic A phase temperature range of Example 1.

DETAILED DESCRIPTION OF THE INVENTION

Hereinafter, the present invention will be described in more detail with reference to the following examples. However, the scope of the present application is not limited by the contents set forth below.

<Preparation Example 1> Preparation of Compound of Formula a-1

The compound of Formula a-1 was prepared according to the following reaction scheme.

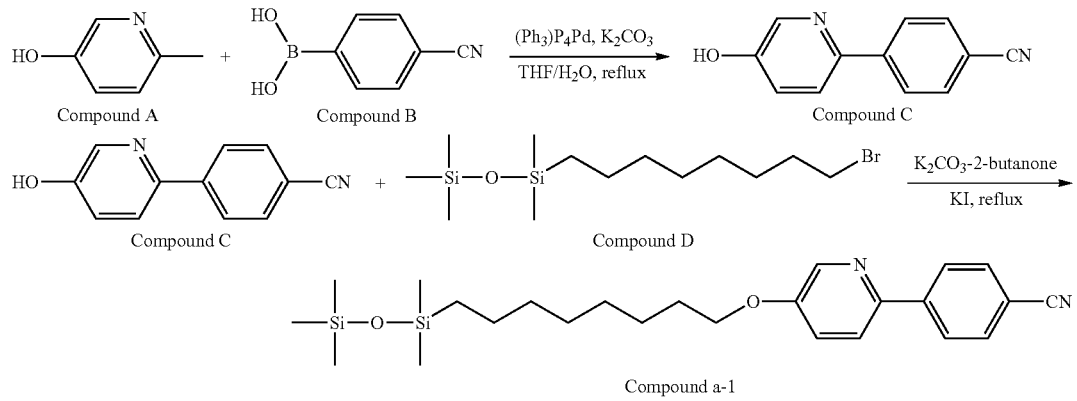

The bistable device may further comprise an alignment film, if necessary. In this case, the alignment film may be disposed between the electrode substrate and the liquid crystal layer. The alignment film can additionally control an alignment state of liquid crystals. As the alignment film, a vertical alignment film or a horizontal alignment film can be used. As the alignment film, for example, a contact type alignment film such as a rubbing alignment film or an alignment film which comprises a compound for an optical alignment film and is known to be capable of exhibiting orientation characteristics by a non-contact method such as irradiation of a linearly polarized light can be used, without being limited thereto.

The bistable device can be used, for example, as a smart window. The term "smart window" herein refers to a window manufactured so as to be capable of freely adjusting transmittance of sunlight, which may be referred to as an electronic curtain, a variable transmittance glass, or a dimming glass. The method of constructing the smart window is not particularly limited, and a conventional method can be applied as long as the liquid crystal compound and the bistable device of the present application are used.

Specifically, the compound A (12.0 g, 69.0 mmol) and the compound B (10.1 g, 69.0 mmol) were completely dissolved in tetrahydrofuran (200 ml), and then 3M potassium carbonate aqueous solution (100 ml) was added thereto and tetrakistriphenyl-phosphinopalladium (800 mg, 0.69 mmol) was added thereto, followed by heating and stirring for 4 hours. After the temperature was lowered to room temperature and the reaction was terminated, the reactant was adjusted to pH 2~3 with concentrated hydrochloric acid and the organic layer was separated and treated with magnesium sulfate. After filtration and concentration, the compound of Formula C (9.8 g, yield 72%) was prepared and used in the next reaction without further purification process.

The compound C (9.8 g, 50.0 mmol) and the compound D (17.0 g, 50.0 mmol) were dissolved in 2-butanone (160 mL), and then potassium carbonate (13.8 g, 100.0 mmol) and potassium iodide (830 mg, 5.0 mmol) were added thereto and the mixture was refluxed and stirred. After 12 hours, water (160 ml) and ethyl acetate (160 ml) were added thereto and the organic layer was separated and washed with brine and then treated with magnesium sulfate. After filtration, the filtrate was concentrated, and purified by a final column chromatography (hexane/EA=5/1) to prepare the compound of Formula a-1 (18.7 g, yield 82.5%).

MS [M+H]$^+$=455

<Preparation Example 2> Preparation of Compound of Formula a-2

The compound of Formula a-2 was prepared according to the following reaction scheme.

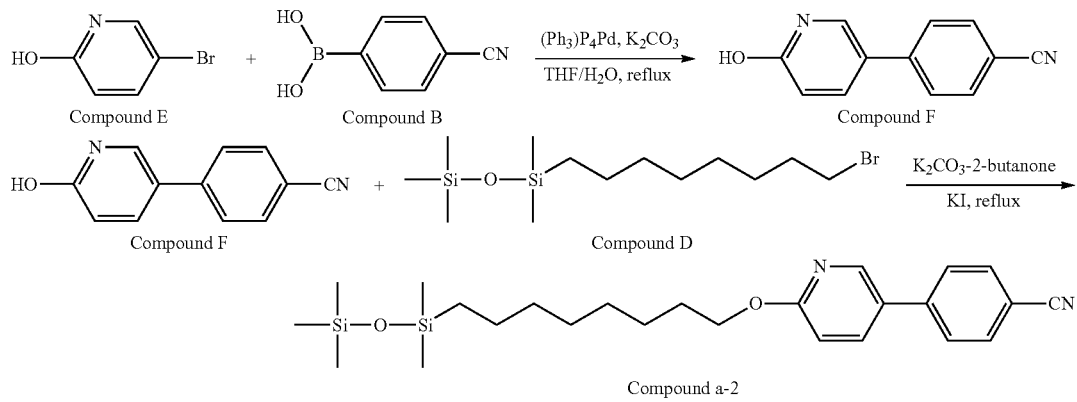

Specifically, the compound of Formula F was prepared in the same method as the method of preparing the compound C of Preparation Example 1, except that the compound E was used instead of the compound A.

The compound of Formula a-2 was prepared in the same method as the method of preparing the compound of Formula a-1 in Preparation Example 1, except that the compound F was used instead of the compound C.

MS $[M+H]^+$=455

<Preparation Example 3> Preparation of Compound of Formula a-3

The compound of Formula a-3 was prepared according to the following reaction scheme.

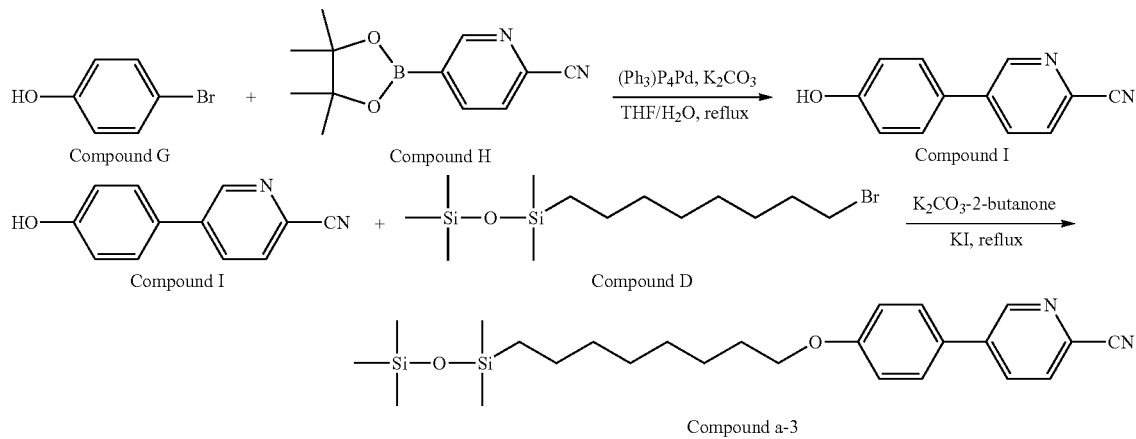

Specifically, the compound of Formula I was prepared in the same method as the method of preparing the compound C of Preparation Example 1, except that the compound G was used instead of the compound A and the compound H was used instead of the compound B.

The compound of Formula a-3 was prepared in the same method as the method of preparing the compound of Formula a-1 in Preparation Example 1, except that the compound I was used instead of the compound C.

MS $[M+H]^+$=455

<Preparation Example 4> Preparation of Compound of Formula a-4

The compound of Formula a-4 was prepared according to the following reaction scheme.

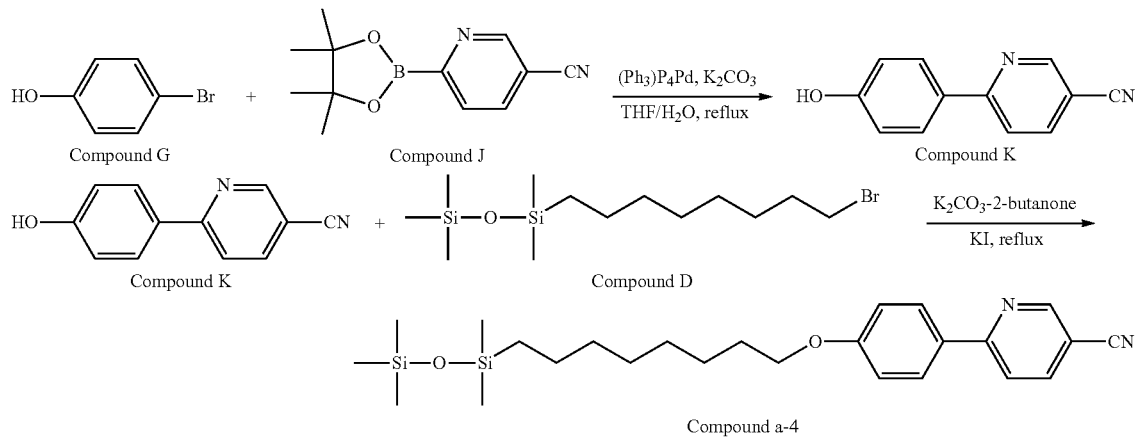

Specifically, the compound of Formula K was prepared in the same method as the method of preparing the compound C of Preparation Example 1, except that the compound G was used instead of the compound A and the compound J was used instead of the compound B.

The compound of Formula a-4 was prepared in the same method as the method of preparing the compound of Formula a-1 in Preparation Example 1, except that the compound K was used instead of the compound C.

MS $[M+H]^+$=455

<Preparation Example 5> Preparation of Compound of Formula a-5

The compound of Formula a-5 was prepared according to the following reaction scheme.

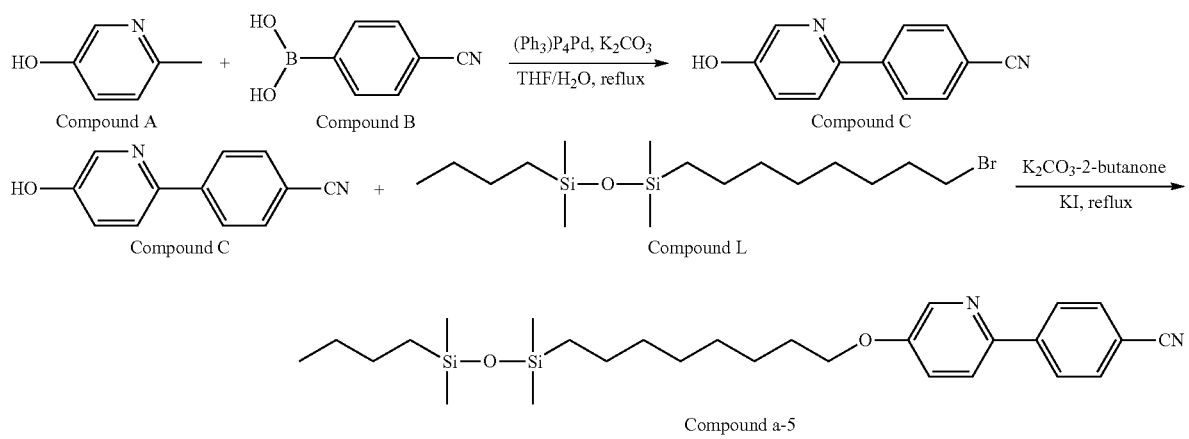

Specifically, the compound of Formula a-5 was prepared in the same method as the method of preparing the compound of Formula a-1 in Preparation Example 1, except that the compound L was used instead of the compound D.

MS $[M+H]^+$=497

<Preparation Example 6> Preparation of Compound of Formula a-6

The compound of Formula a-6 was prepared according to the following reaction scheme.

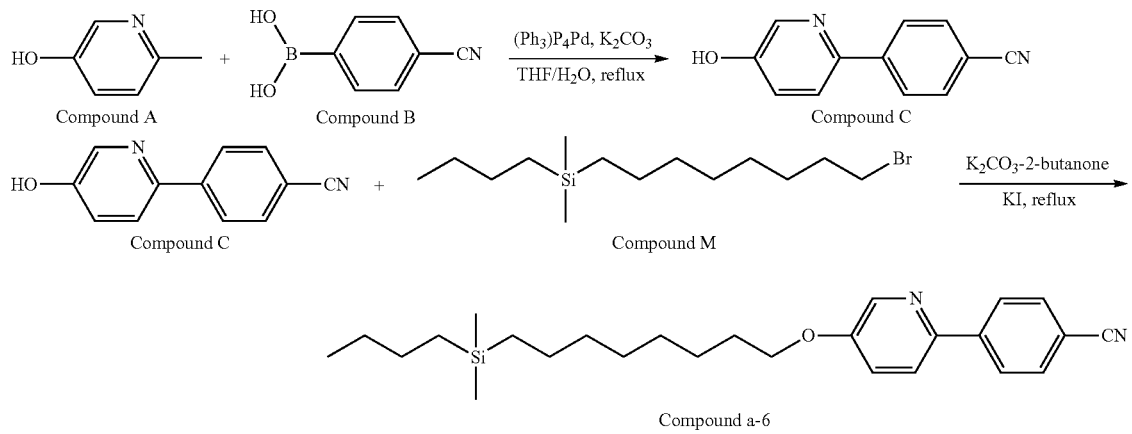

Specifically, the compound of Formula a-6 was prepared in the same method as the method of preparing the compound of Formula a-1 in Preparation Example 1, except that the compound M was used instead of the compound D.
MS [M+H]$^+$=423

<Preparation Example 7> Preparation of Compound of Formula a-10

The compound of Formula a-10 was prepared according to the following reaction scheme.

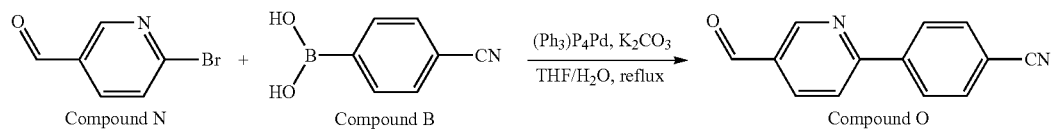

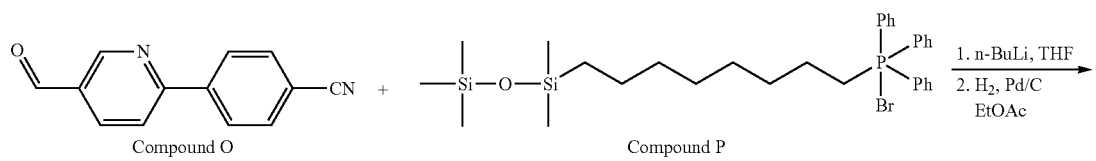

Specifically, the compound of Formula O was prepared in the same method as the method of preparing the compound C, except that the compound N was used instead of the compound A.

The compound P (43.4 g, 72.2 mmol) was completely dissolved in tetrahydrofuran (200 ml), and then 1.6M n-butyl lithium (45.1 ml) was added in drops thereto at 0° C. for 1 hour. After 30 minutes, the temperature was raised to room temperature and the reactant was stirred for 1 hour. The compound O (10.0 g, 48.1 mmol) was dissolved in tetrahydrofuran (50 mL) and added in drops thereto at 0° C. for 1 hour. The temperature was raised to room temperature and the reactant was stirred for 12 hours. After completing the reaction, the resultant was filtered, concentrated and purified by a column chromatography (hexane/EA=5/1) to synthesize a precursor of Formula a-10. This precursor was dissolved in ethyl acetate (200 mL), and then palladium/charcoal (1.0 g) was added thereto, a hydrogen balloon was hung, and the reactant was stirred for 12 hours. After completing the reaction, the filtrate filtered through a Celite pad was concentrated to prepare the compound of Formula a-10 (10.9 g, yield 50.0%).
MS [M+H]$^+$=453

<Preparation Example 8> Preparation of Compound of Formula a-11

The compound of Formula a-11 was prepared according to the following reaction scheme.

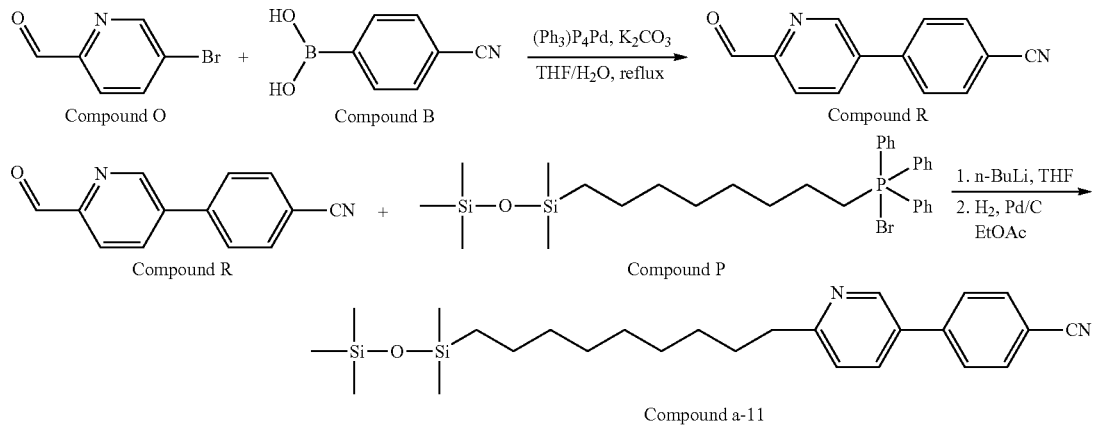

Specifically, the compound of Formula R was prepared in the same method as the method of preparing the compound C of Preparation Example 1, except that the compound Q was used instead of the compound A.

The compound of Formula a-11 was prepared in the same method as the method of preparing the compound of Formula a-10 in Preparation Example 7, except that the compound R was used instead of the compound O.

MS [M+H]$^+$=453

<Preparation Example 9> Preparation of Compound of Formula a-12

The compound of Formula a-12 was prepared according to the following reaction scheme.

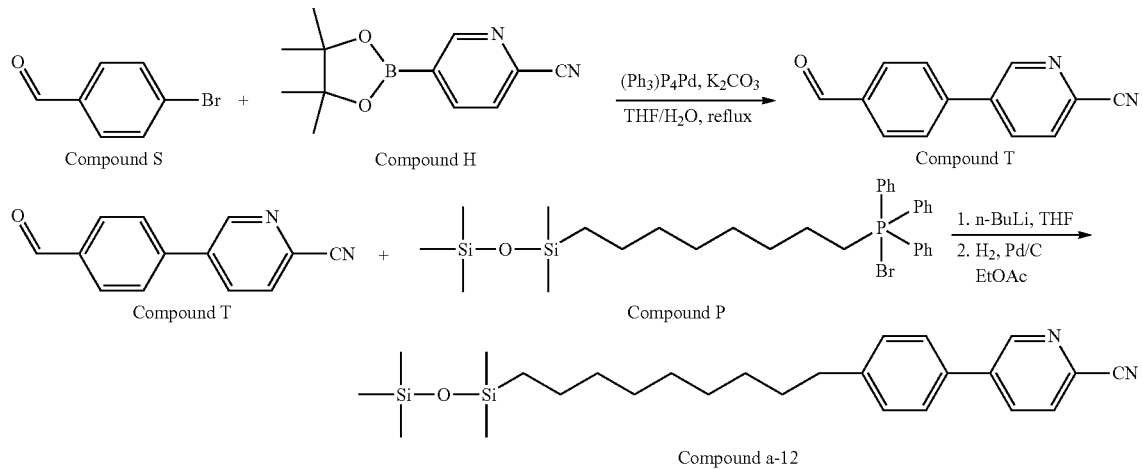

Specifically, the compound of Formula T was prepared in the same method as the method of preparing the compound C of Preparation Example 1, except that the compound S was used instead of the compound A and the compound H was used instead of the compound B.

The compound of Formula a-12 was prepared in the same method as the method of preparing the compound of Formula a-10 in Preparation Example 7, except that the compound T was used instead of the compound O.

MS [M+H]$^+$=453

<Preparation Example 10> Preparation of Compound of Formula a-13

The compound of Formula a-13 was prepared according to the following reaction scheme.

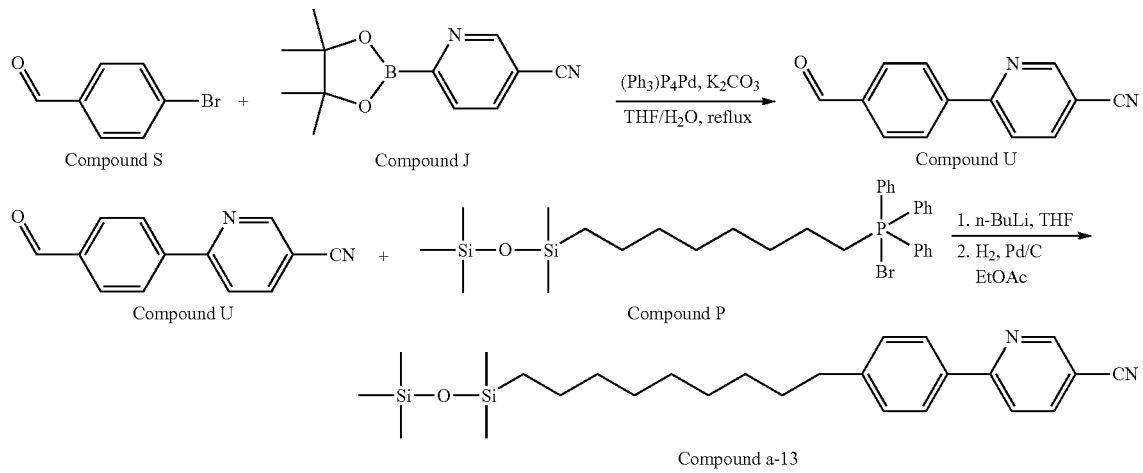

Specifically, the compound of Formula U was prepared in the same method as the method of preparing the compound C of Preparation Example 1, except that the compound S was used instead of the compound A and the compound J was used instead of the compound B.

The compound of Formula a-13 was prepared in the same method as the method of preparing the compound of Formula a-10 in Preparation Example 7, except that the compound U was used instead of the compound O.

MS [M+H]$^+$=453

<Preparation Example 11> Preparation of Compound of Formula a-14

The compound of Formula a-14 was prepared according to the following reaction scheme.

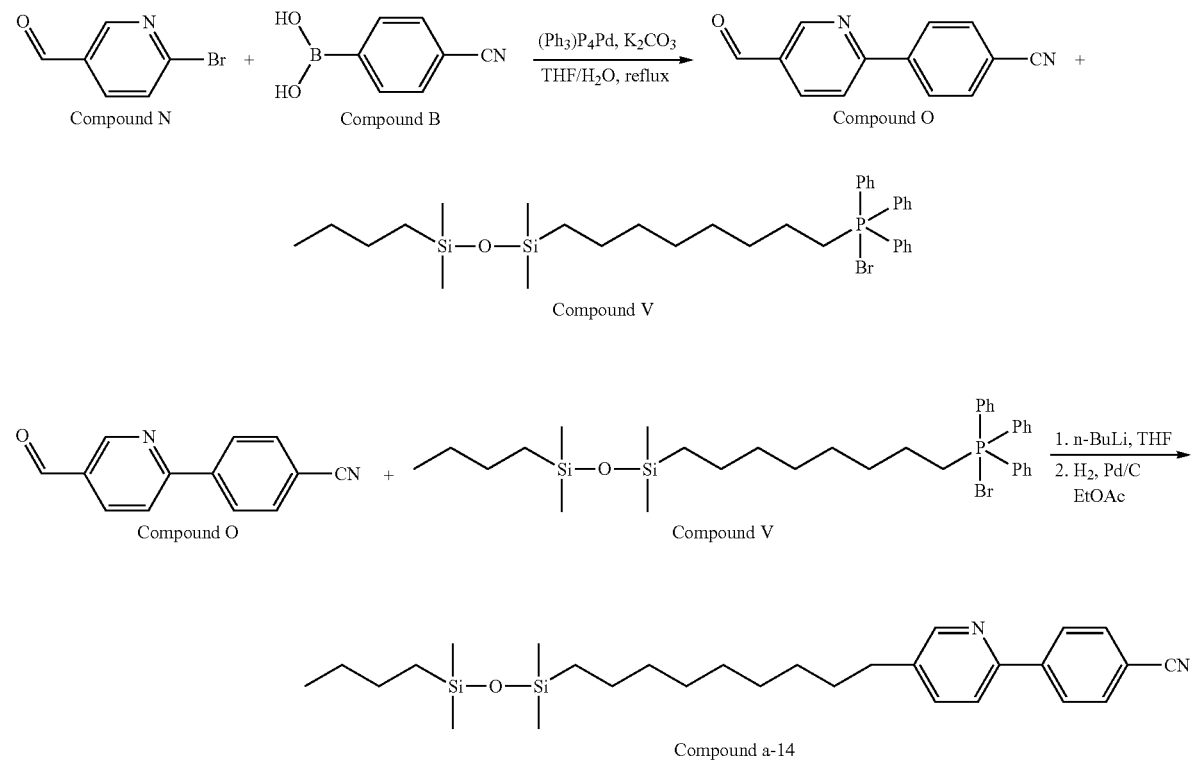

Specifically, the compound of Formula O was prepared in the same method as the method of preparing the compound C of Preparation Example 1, except that the compound N was used instead of the compound A.

The compound of Formula a-14 was prepared in the same method as the method of preparing the compound of Formula a-10 in Preparation Example 7, except that the compound V was used instead of the compound P.

MS [M+H]⁺=495

<Preparation Example 12> Preparation of Compound of Formula a-15

The compound of Formula a-15 was prepared according to the following reaction scheme.

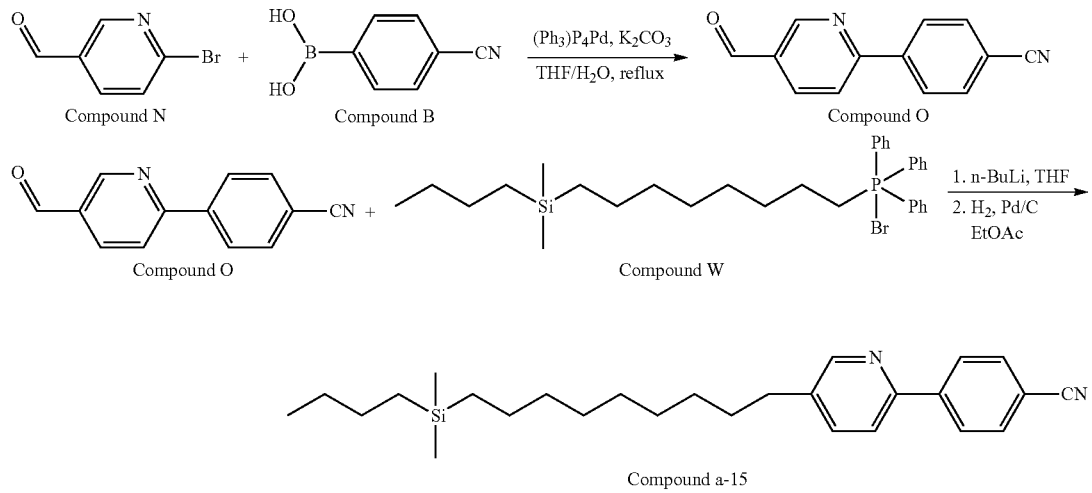

Specifically, the compound of Formula O was prepared in the same method as the method of preparing the compound C of Preparation Example 1, except that the compound N was used instead of the compound A.

The compound of Formula a-15 was prepared in the same method as the method of preparing the compound of Formula a-10 in Preparation Example 7, except that the compound W was used instead of the compound P.

MS [M+H]⁺=421

Evaluation Example 1: Evaluation of Smectic a Phase Temperature Range

The smectic A phase temperature range was evaluated using the compounds prepared in Preparation Examples 1 to 12 as Examples 1 to 12, respectively, and the results were shown in Table 1 below. The smectic A phase temperature range was evaluated by observing the phase change by the differential scanning calorimetry (DSC) measurement and the polarized light microscopy. FIG. 1 is the results of evaluating the smectic A phase temperature range of Example 1.

TABLE 1

| Example | Smectic A Temperature |
|---|---|
| 1 | 0° C.~69° C. |
| 2 | −12° C.~51° C. |
| 3 | 21° C.~72° C. |
| 4 | 1° C.~70° C. |
| 5 | 15° C.~66° C. |
| 6 | −8° C.~11° C. |
| 7 | 5° C.~70° C. |
| 8 | 8° C.~66° C. |

TABLE 1-continued

| Example | Smectic A Temperature |
|---|---|
| 9 | 19° C.~78° C. |
| 10 | 14° C.~68° C. |
| 11 | 20° C.~54° C. |
| 12 | 7° C.~25° C. |

The invention claimed is:

1. A liquid crystal compound of the following Formula 1:

[Formula 1]

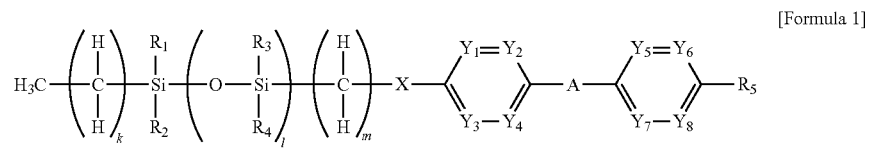

in said Formula 1,
$R_1$ to $R_4$ are each independently an alkyl group having 1 to 3 carbon atoms,
$R_5$ is —F, —Cl, —Br, —OF₃, —NCS, —CN or —OCH₃,
X is —CH₂— or —O—,
k is an integer of 0 to 9,
l is an integer of 0 to 2,
m is an integer of 2 to 13,
$Y_1$ to $Y_8$ are each independently CH, CF or N, where CF of $Y_1$ to $Y_8$ is not more than 2, A is the following Formula 2, or a single bond, —O—, —S—, —CO—, —COO—, —OCO—, —S—CO—, —CO—S—, —O—COO, —CO—NR⁰—, —NR⁰—CO—, —NR⁰—CO—NR⁰⁰—, —NR⁰—CO—O—, —O—CO—NR⁰—, OCH₂—, —OCH₂—, —SCH₂—, —CH₂S—, —CF₂O—, —OCF₂—, —CF₂S—, —SCF₂—, —CH₂CH₂—, —(CH₂)₄—, —CF₂CH₂—, —CH₂CHF₂—, —CH=N—, —N=CH—, —NH—NH—, —N=N—, —CH—CR⁰—, —CY¹=CY²—, —C≡C—, —CH=CH—COO— or —OCO—CH=CH—, where R⁰, R⁰⁰, Y¹ and Y² are each independently H or CH₃;

[Formula 2]

in said Formula 2, $Z_1$ and $Z_2$ are each independently CH or N, and when said $Z_1$ and $Z_2$ are each CH, at least one of $Y_1$ to $Y_8$ is N, and wherein when A is not a heterocyclic structure then at least one of $Y_1$ to $Y_8$ is N.

2. The liquid crystal compound according to claim 1, wherein in said Formula 1, $R_1$ to $R_4$ are a methyl group.

3. The liquid crystal compound according to claim 1, wherein in said Formula 1, $R_5$ is —CN.

4. The liquid crystal compound according to claim 1, wherein in said Formula 1, k is an integer of 0 to 3.

5. The liquid crystal compound according to claim 1, wherein in said Formula 1, l is 0 or 1.

6. The liquid crystal compound according to claim 1, wherein in said Formula 1, m is an integer of 7 to 9.

7. The liquid crystal compound according to claim 1, wherein in said Formula 1, A is a single bond, any one of $Y_1$ to $Y_8$ is N and the remainder are CH.

8. The liquid crystal compound according to claim 1, wherein in said Formula 1, A is Formula 2, $Z_1$ and $Z_2$ are CH, any one of $Y_1$ to $Y_8$ is N and the remainder are CH.

9. The liquid crystal compound according to claim 1, wherein in said Formula 1, A is Formula 2, $Z_1$ and $Z_2$ are N, and $Y_1$ to $Y_8$ are each CH.

10. The liquid crystal compound according to claim 1, wherein said liquid crystal compound of Formula 1 has a structure represented by the following formulas a-1 to a-18:

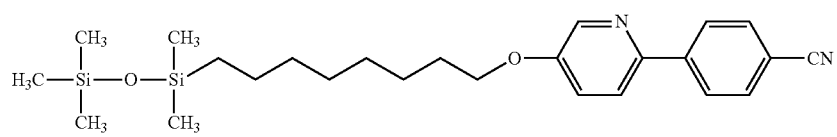
<Formula a-1>

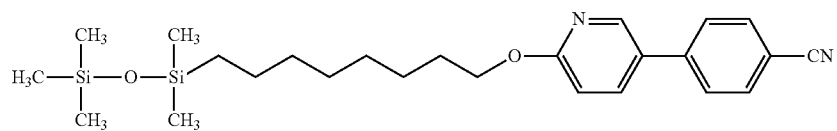
<Formula a-2>

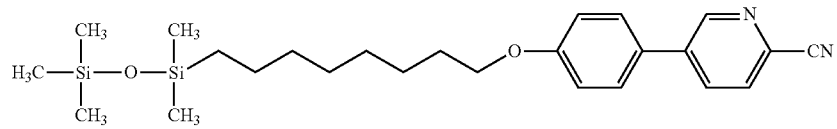
<Formula a-3>

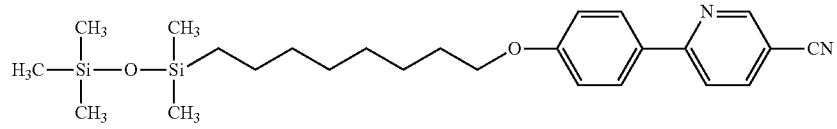
<Formula a-4>

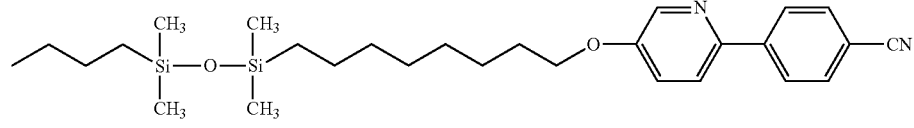
<Formula a-5>

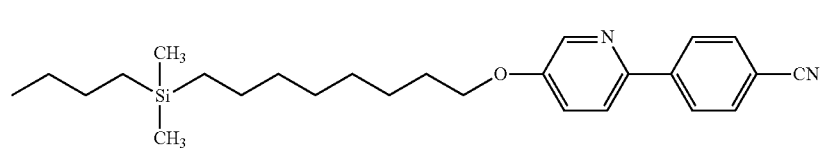
<Formula a-6>

-continued
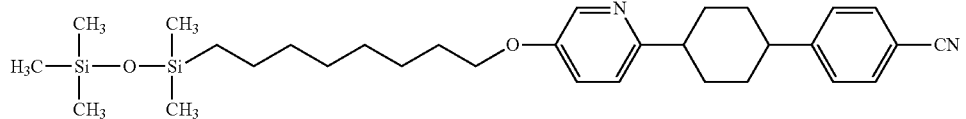
<Formula a-7>
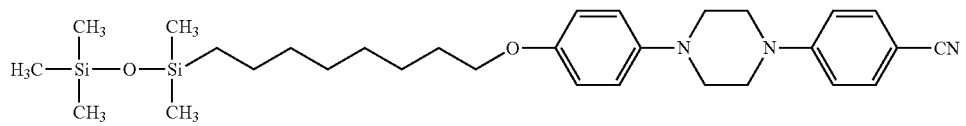
<Formula a-8>
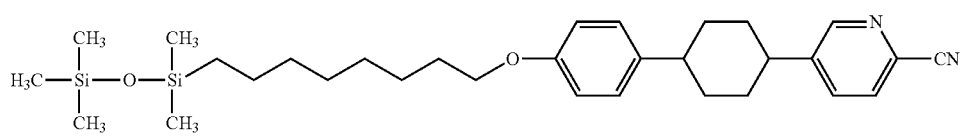
<Formula a-9>
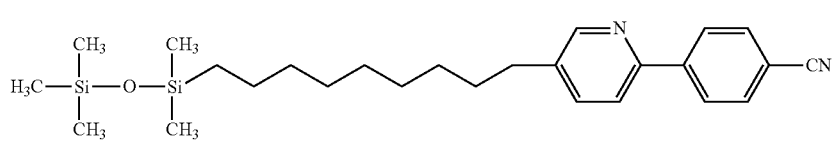
<Formula a-10>
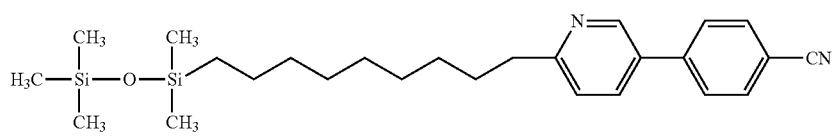
<Formula a-11>
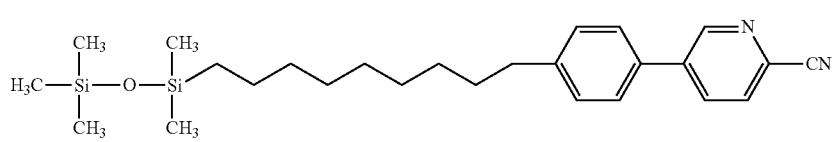
<Formula a-12>
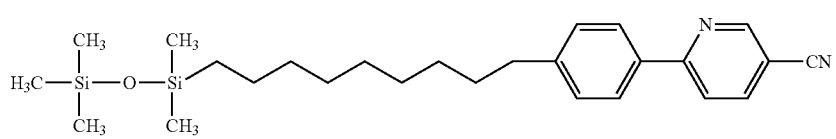
<Formula a-13>
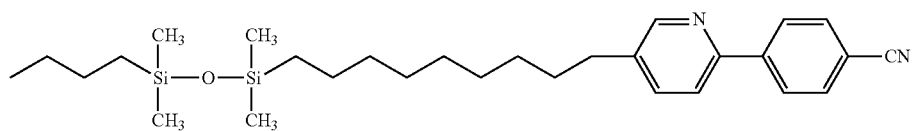
<Formula a-14>
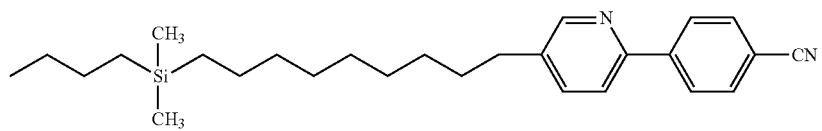
<Formula a-15>
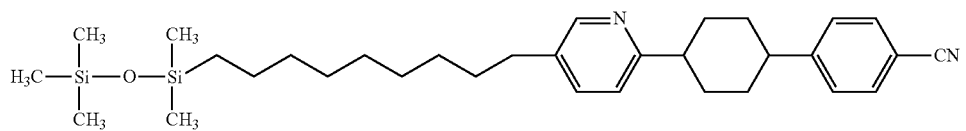
<Formula a-16>
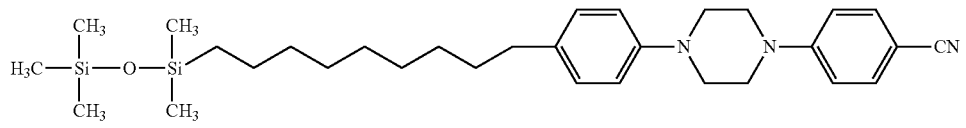
<Formula a-17>

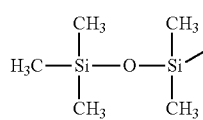 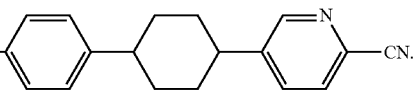

<Formula a-18>

11. The liquid crystal compound according to claim 1, wherein
the liquid crystal compound exhibits a smectic A phase in a temperature range of −20° C. to 100° C.

12. The liquid crystal compound according to claim 1, wherein
the liquid crystal compound has a dielectric anisotropy of −1.0 to 20.

13. A bistable device comprising the liquid crystal compound of claim 1.

14. The bistable device according to claim 13, comprising two electrode substrates disposed opposite to each other and a liquid crystal layer containing the liquid crystal compound of claim 1 and a charging substance between said two electrode substrates.

* * * * *